(12) United States Patent
Abe

(10) Patent No.: US 11,871,097 B2
(45) Date of Patent: Jan. 9, 2024

(54) ELECTRONIC DEVICE, IMAGING APPARATUS, AND MOBILE BODY

(71) Applicant: KYOCERA Corporation, Kyoto (JP)

(72) Inventor: Hiroyuki Abe, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 176 days.

(21) Appl. No.: 17/438,718

(22) PCT Filed: Mar. 12, 2020

(86) PCT No.: PCT/JP2020/010904
§ 371 (c)(1),
(2) Date: Sep. 13, 2021

(87) PCT Pub. No.: WO2020/189524
PCT Pub. Date: Sep. 24, 2020

(65) Prior Publication Data
US 2022/0159160 A1 May 19, 2022

(30) Foreign Application Priority Data
Mar. 20, 2019 (JP) .................................. 2019-053724

(51) Int. Cl.
*H04N 23/52* (2023.01)
*H04N 23/54* (2023.01)

(52) U.S. Cl.
CPC ............. *H04N 23/52* (2023.01); *H04N 23/54* (2023.01)

(58) Field of Classification Search
CPC ............................... H04N 23/52; H04N 23/54
USPC ....................................................... 348/148
See application file for complete search history.

(56) References Cited

U.S. PATENT DOCUMENTS

| | | | |
|---|---|---|---|
| 8,970,700 B2 | 3/2015 | Inoue et al. | |
| 2008/0014797 A1* | 1/2008 | Yang | H01R 13/6582 439/607.01 |
| 2011/0025850 A1* | 2/2011 | Maekawa | H04N 7/102 348/148 |
| 2011/0279675 A1* | 11/2011 | Mano | H04N 23/55 348/148 |

(Continued)

FOREIGN PATENT DOCUMENTS

| | | |
|---|---|---|
| JP | 2011-259101 A | 12/2011 |
| JP | 2017098891 A * | 6/2017 |

*Primary Examiner* — Matthew David Kim
(74) *Attorney, Agent, or Firm* — Studebaker & Brackett PC

(57) ABSTRACT

An electronic device includes a first substrate and a second substrate, a first metal plate, and a second metal plate. On each of the first substrate and the second substrate, an electronic component is mounted. The first substrate and the second substrate are positioned toward a stacking direction with respective main surfaces facing each other. The first metal plate includes a flat portion that is interposed between the first substrate and the second substrate and that directly or indirectly abuts the electronic component mounted on the first substrate and the electronic component mounted on the second substrate, and a first shield portion that covers a portion of the side surface of the first substrate. The second metal plate includes a second shield portion that covers the entire circumference of the side surface of the second substrate and the side surface of the first substrate exposed from the first metal plate. The first metal plate and the second metal plate abut each other directly or indirectly.

7 Claims, 26 Drawing Sheets

(56) References Cited

U.S. PATENT DOCUMENTS

| | | | |
|---|---|---|---|
| 2014/0320657 A1* | 10/2014 | Han | H04N 23/57 |
| | | | 348/148 |
| 2020/0145560 A1* | 5/2020 | Han | G03B 30/00 |
| 2020/0269771 A1* | 8/2020 | Sim | G03B 17/08 |
| 2021/0105387 A1* | 4/2021 | Nakamura | G03B 30/00 |
| 2021/0127532 A1* | 4/2021 | Persson | H04N 23/57 |

* cited by examiner

ELECTRONIC DEVICE, IMAGING APPARATUS, AND MOBILE BODY

CROSS REFERENCES TO RELATED APPLICATIONS

The present application claims priority of Japanese Patent Application No. 2019-053724, filed on Mar. 20, 2019 in Japan, the entire disclosure of the earlier application is incorporated herein by reference.

TECHNICAL FIELD

The present disclosure relates to an electronic device, an imaging apparatus, and a mobile body.

BACKGROUND ART

Electronic devices such as onboard cameras are required to be downsized and to perform various processing at a high speed. As a result of a circuit board being multilayered and highly-integrated for downsizing, radiation noise and the amount of heat generated by an electronic device of the circuit board are increased. There is proposed a configuration in which the entirety of the side surface of a circuit board is covered by a shield member and in which the circuit board and a heat conduction member abut each other via a heat conduction member made of a soft material such as silicone gel.

SUMMARY OF INVENTION

To solve the above problems, an electronic device according to a first aspect includes:
- a first substrate and a second substrate on each of which an electronic component is mounted, the first substrate and the second substrate being positioned toward a stacking direction with respective main surfaces facing each other;
- a first metal plate including a flat portion that is interposed between the first substrate and the second substrate and that directly or indirectly abuts the electronic component mounted on the first substrate and the electronic component mounted on the second substrate, and a first shield portion that covers a portion of a side surface of the first substrate; and
- a second metal plate including a second shield portion that covers an entire circumference of a side surface of the second substrate and the side surface of the first substrate exposed from the first metal plate,
- in which the first metal plate and the second metal plate abut each other directly or indirectly.

An imaging apparatus according to a second aspect includes:
- a first substrate and a second substrate on each of which an electronic component is mounted, the first substrate and the second substrate being positioned toward a stacking direction with respective main surfaces facing each other;
- a first metal plate including a flat portion that is interposed between the first substrate and the second substrate and that directly or indirectly abuts the electronic component mounted on the first substrate and the electronic component mounted on the second substrate, and a first shield portion that covers a portion of a side surface of the first substrate; and
- a second metal plate including a second shield portion that covers an entire circumference of a side surface of the second substrate and the side surface of the first substrate exposed from the first metal plate,
- in which the first metal plate and the second metal plate abut each other directly or indirectly.

A mobile body according to a third aspect includes an imaging apparatus mounted thereon, the imaging apparatus including:
- a first substrate and a second substrate on each of which an electronic component is mounted, the first substrate and the second substrate being positioned toward a stacking direction with respective main surfaces facing each other;
- a first metal plate including a flat portion that is interposed between the first substrate and the second substrate and that directly or indirectly abuts the electronic component mounted on the first substrate and the electronic component mounted on the second substrate, and a first shield portion that covers a portion of a side surface of the first substrate; and
- a second metal plate including a second shield portion that covers an entire circumference of a side surface of the second substrate and the side surface of the first substrate exposed from the first metal plate,
- in which the first metal plate and the second metal plate abut each other directly or indirectly.

BRIEF DESCRIPTION OF DRAWINGS

FIG. 2 is a sectional view illustrating a general configuration of the electronic device in FIG. 1, the sectional view being cut to pass through an optical axis of an imaging optical system and.

DESCRIPTION OF EMBODIMENTS

Electronic devices are demanded to further improve heat dissipation properties with a simple configuration while having shielding properties with respect to radiation noise. An object of the present disclosure is to provide an electronic device that further improves heat dissipation properties with a simple configuration while having shielding properties with respect to radiation noise, an imaging apparatus, and a mobile body.

Hereinafter, an electronic device, an imaging apparatus, and a mobile body according to a first embodiment of the present disclosure will be described with reference to the drawings.

Figure 1:
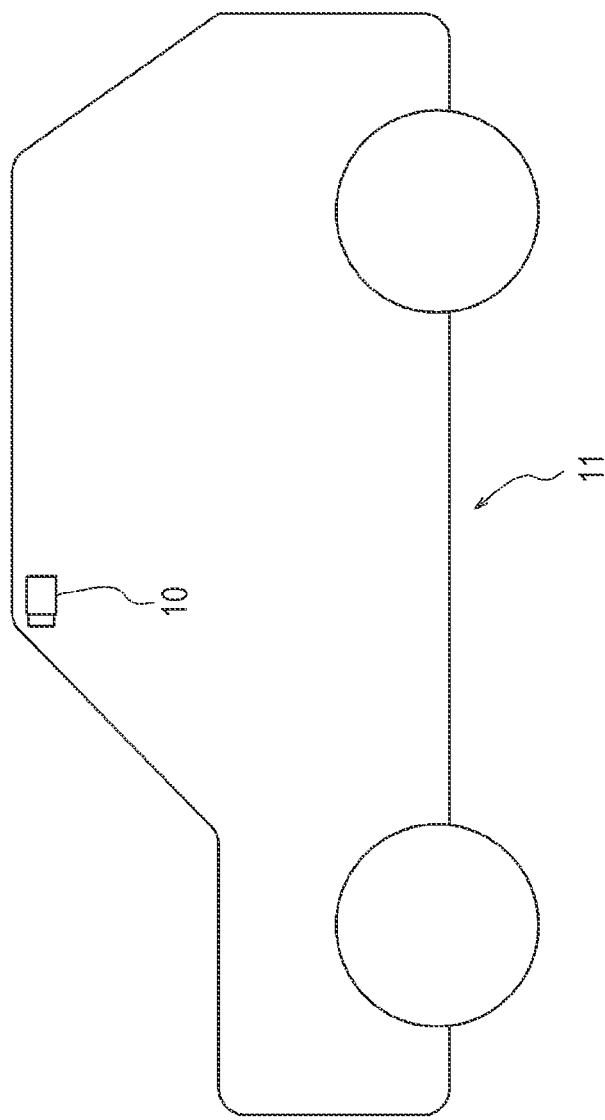
FIG. 1 is an arrangement diagram illustrating a mounting position of an electronic device according to a first embodiment in a mobile body.

Specifically, the electronic device according to the first embodiment is, for example, an imaging apparatus. As illustrated in FIG. 1, an electronic device 10 applied to the imaging apparatus according to the first embodiment is, for example, mounted on a mobile body 11.

The mobile body 11 may include, for example, vehicles, marine vessels, aircrafts, and the like. Vehicles may include, for example, automobiles, industrial vehicles, railway vehicles, living vehicles, fixed-wing aircrafts that travel on runways, and the like. Automobiles may include, for example, passenger cars, trucks, buses, bicycles, trolley buses, and the like. Industrial vehicles may include, for example, industrial vehicles for agriculture and construction, and the like. Industrial vehicles may include, for example, forklifts, golf carts, and the like. Industrial vehicles for agriculture may include, for example, tractors, cultivators, transplanters, binders, combine harvesters, lawnmowers, and the like. Industrial vehicles for construction may include, for example, bulldozers, scrapers, power shovels, crane trucks, dump trucks, road rollers, and the like. Vehicles may include man-powered vehicles. Classification of vehicles is not limited to the above examples. For example, automobiles may include industrial vehicles that can travel on roads. The same vehicles may be included in a plurality of categories. Marine vessels may include, for example, jet skis, boats, tankers, and the like. Aircrafts may include, for example, fixed-wing aircrafts, rotary-wing aircrafts, and the like.

Figure 2:
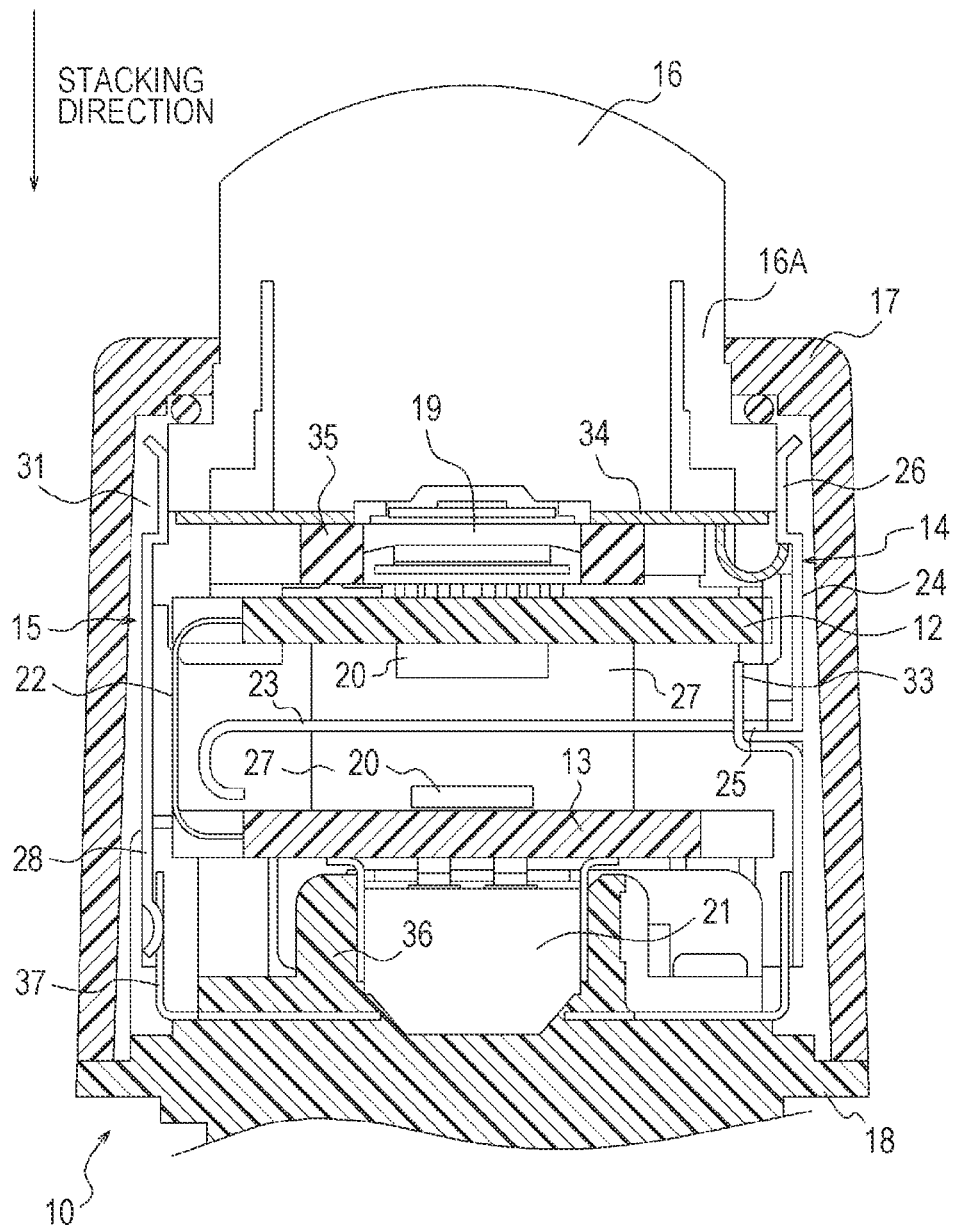
Figure 3:
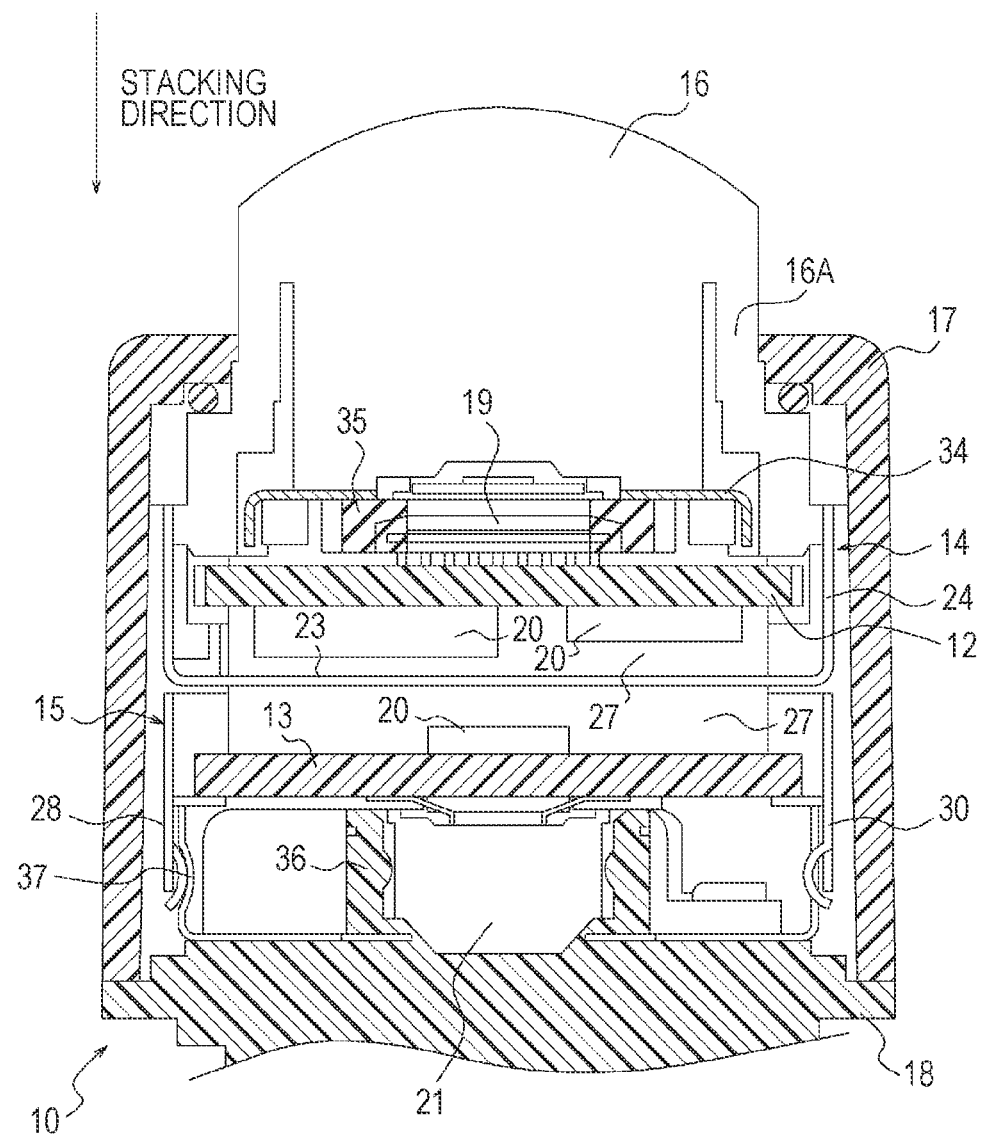
FIG. 3 is a sectional view in which the electronic device in FIG. 1 is rotated around the optical axis by 90° from that in the section in FIG. 2.

As illustrated in FIG. 2 and FIG. 3, the electronic device 10 includes a first substrate 12, a second substrate 13, a first metal plate 14, and a second metal plate 15. The electronic device 10 may further include an imaging optical system 16, a first housing 17, and a second housing 18.

Figure 4:
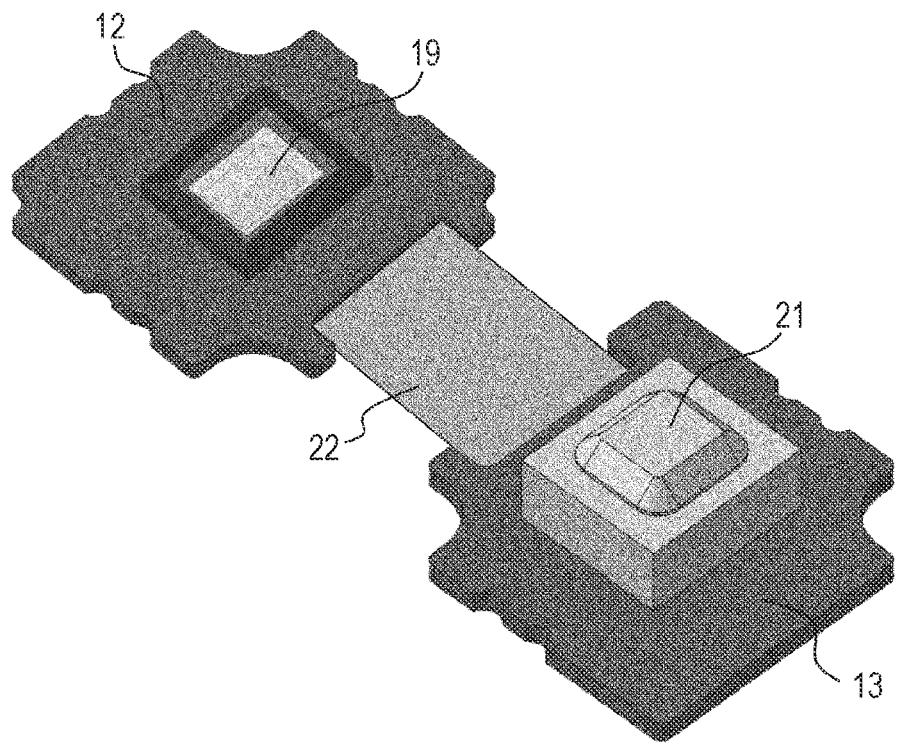
FIG. 4 is a front perspective view illustrating appearances of a first substrate and a second substrate in FIG. 2 and FIG. 3.
Figure 5:
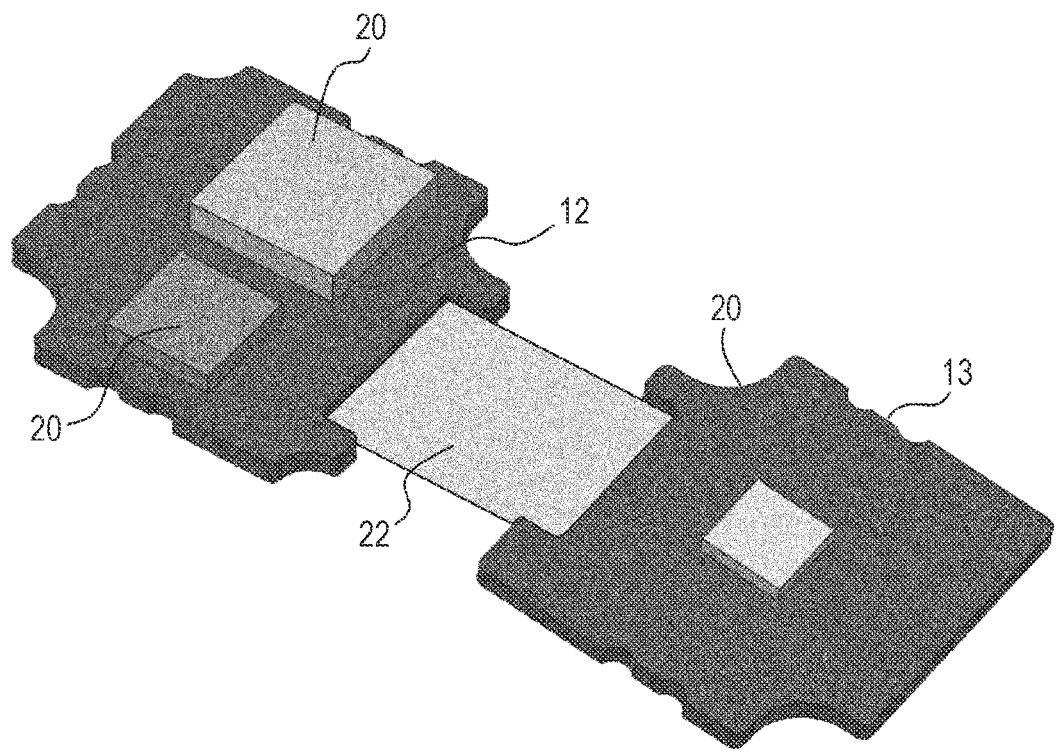
FIG. 5 is a rear perspective view illustrating appearances of the first substrate and the second substrate in FIG. 2 and FIG. 3.

As illustrated in FIG. 4 and FIG. 5, the first substrate 12 has a flat shape. The first substrate 12 may have a substantially rectangular shape. As illustrated in FIG. 2 and FIG. 3, an imaging element 19 as an electronic component is mounted on the first substrate 12 on a side opposite to a surface facing a flat portion 23, which will be described later. The imaging element 19 is, for example, a CCD (Charge Coupled Device) image sensor and a CMOS (Complementary Metal Oxide Semiconductor) image sensor. The imaging element 19 images an optical image formed on a light receiving surface and thereby generates an image signal. An electronic component 20 is mounted on at least one main surface of the first substrate 12. The electronic component 20 drives the imaging element 19 or processes an image signal generated by the imaging element 19.

As illustrated in FIG. 4 and FIG. 5, the second substrate 13 has a flat shape. The second substrate 13 may have a substantially rectangular shape. An electronic component 20 is mounted on at least one main surface of the second substrate 13. The electronic component 20 drives the imaging element 19 or processes an image signal generated by the imaging element 19. A first connector 21 for electrical connection to the second housing 18 may be mounted on one main surface of the second substrate 13.

The first substrate 12 may be electrically connected to the second substrate 13 by a flexible substrate 22. As illustrated in FIG. 4, the imaging element 19 of the first substrate 12 and the first connector 21 of the second substrate 13 may be mounted on main surfaces on the same side in a state in which the entirety of the flexible substrate 22 is extended in a flat shape.

As illustrated in FIG. 2 and FIG. 3, in the electronic device 10, the first substrate 12 and the second substrate 13 are positioned toward a stacking direction with respective main surfaces facing each other.

Figure 6:
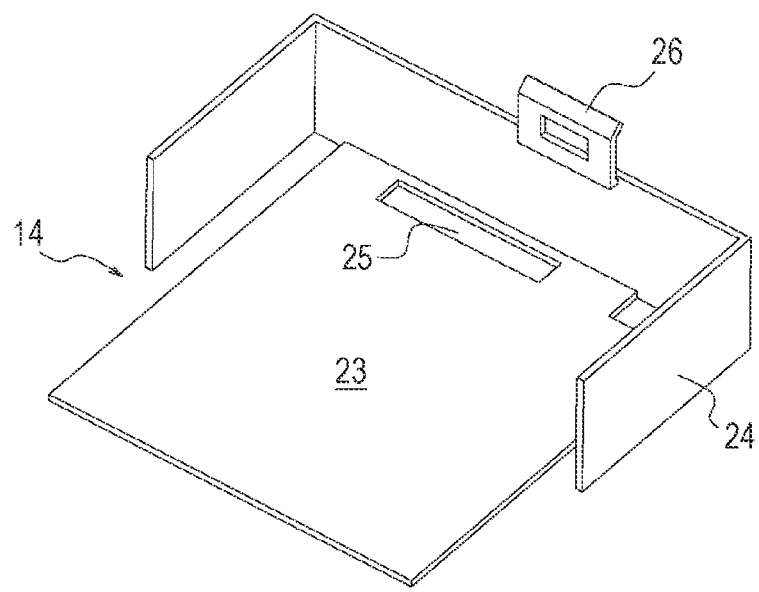
FIG. 6 is a perspective view illustrating an appearance of a first metal plate in FIG. 2 and FIG. 3.

As illustrated in FIG. 6, the first metal plate 14 includes the flat portion 23 and a first shield portion 24.

The flat portion 23 has a flat shape. The flat portion 23 may have a substantially rectangular shape wider than the first substrate 12 and the second substrate 13. As illustrated in FIG. 2 and FIG. 3, the flat portion 23 is interposed between the first substrate 12 and the second substrate 13 in the stacking direction in the electronic device 10. In the electronic device 10, a main surface of the flat portion 23 may be substantially parallel to main surfaces of the first substrate 12 and the second substrate 13.

As illustrated in FIG. 6, the flat portion 23 includes an open portion 25 near a side coupled to the first shield portion 24. The open portion 25 may have a substantially rectangular shape. As illustrated in FIG. 2, the open portion 25 is locked with two lock portions 33 of the second metal plate 15 in the electronic device 10.

In the electronic device 10, the flat portion 23 directly or indirectly abuts the electronic component 20 mounted on the first substrate 12 and the electronic component 20 mounted on the second substrate 13. In the electronic device 10, the flat portion 23, for example, indirectly abuts the imaging element 19 as an electronic component via a heat dissipation sheet 27 and the first substrate 12. In the electronic device 10, the flat portion 23, for example, indirectly abuts the electronic component 20 mounted on the second substrate 13 via the heat dissipation sheet 27. The heat dissipation sheet 27 may be made of, for example, a soft material having shape followability, like filler-containing silicone rubber, and having relatively large thermal conductivity.

As illustrated in FIG. 6, the first shield portion 24 stands, on the side of the main surface of the flat portion 23 facing the first substrate 12, along a portion of the outer edge of the flat portion 23. For example, the first shield portion 24 stands along the entirety of one side of the flat portion 23 and portions of two sides at both ends of the one side. As illustrated in FIG. 2 and FIG. 3, the first shield portion 24 covers a portion of a side surface of the first substrate 12 in the electronic device 10.

As illustrated in FIG. 6, the first shield portion 24 includes a first fixation portion 26. In the present embodiment, the first shield portion 24 includes the first fixation portion 26 at a substantially center part of a side facing a side coupled to the flat portion 23. As illustrated in FIG. 2 and FIG. 3, the first metal plate 14 is fixed by the first fixation portion 26 to a lens barrel 16A that houses the imaging optical system 16. For example, engagement is employed for fixation of the first fixation portion 26 to the lens barrel 16A of the imaging optical system 16. The fixation is, however, not limited thereto, and welding, bonding with an adhesive, fastening with a screw, and the like may be employed for the fixation.

Figure 7:
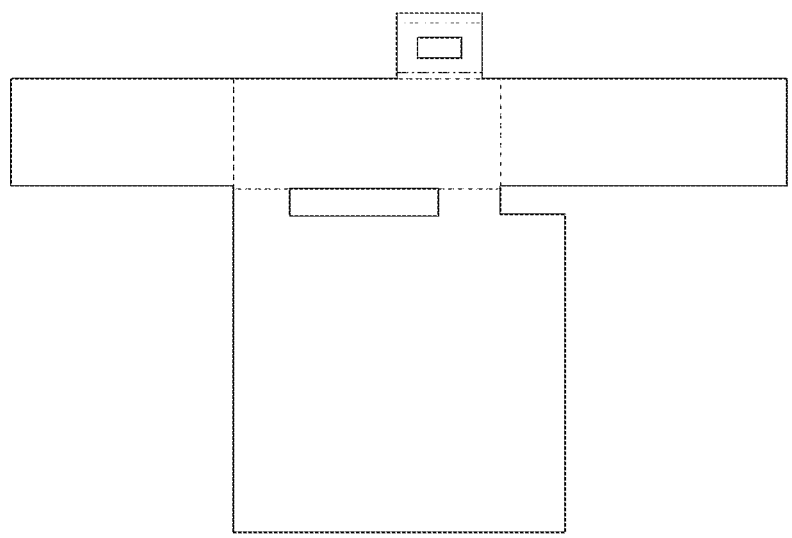
FIG. 7 is a development plan view of the first metal plate in FIG. 6.

The first metal plate 14 is a metal plate, in other words, a metal flat plate having a desired shape such as that illustrated in FIG. 7 and whose predetermined portions are bent. In FIG. 7, straight lines to be bent on the surface side are indicated by broken lines, and straight lines to be bent on the rear surface side are indicated by one-dot chain lines. When the bent portions of the first metal plate 14 are unbent into a flat shape, all of parts of the first metal plate 14 are thus separated from each other without interfering with each other. The first metal plate 14 may be made of, for example, a metal such as copper or the like having large thermal conductivity.

Figure 8:
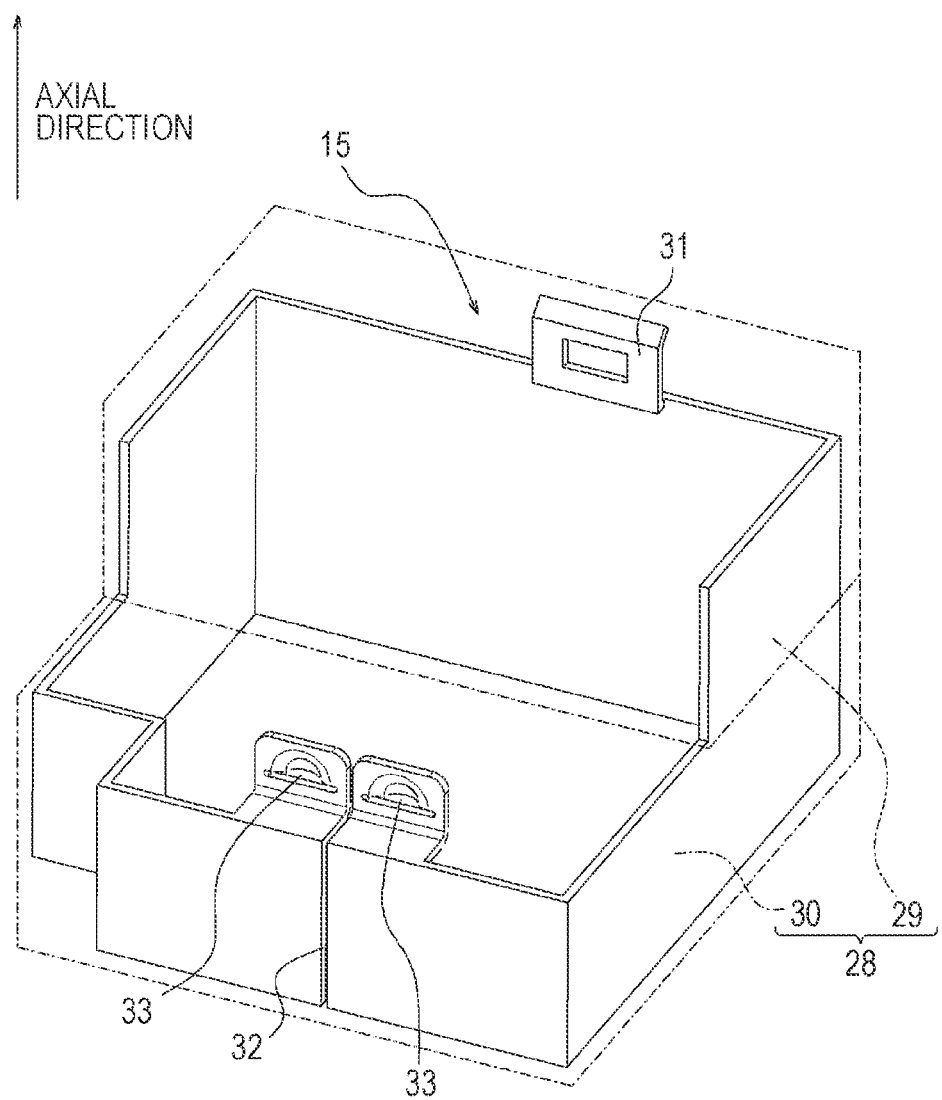
FIG. 8 is a perspective view illustrating an appearance of a second metal plate in FIG. 2 and FIG. 3.

As illustrated in FIG. 8, the second metal plate 15 includes a second shield portion 28.

The second shield portion 28 has a substantially rectangular cylindrical shape, and one side of a rectangular shape of a section in an axial direction and portions of two sides at both ends of the one side project in a C-shape in the axial direction. That is, the second shield portion 28 includes an all shield portion 30 having a substantially rectangular cylindrical shape, and a part shield portion 29 continuous from the all shield portion 30 in the axial direction and having a rectangular cylindrical shape whose a portion in a circumferential direction is cut out. As illustrated in FIG. 2 and FIG. 3, the second metal plate 15 covers the entire circumference of the side surface of the second substrate 13 and the side surface of the first substrate 12 exposed from the first metal plate 14 in the electronic device 10. In this configuration, the all shield portion 30 covers the entire circumference of the side surface of the second substrate 13. The part shield portion 29 covers the side surface of the first substrate 12 exposed from the first metal plate 14.

As illustrated in FIG. 8, the second shield portion 28 includes a second fixation portion 31 at an end of the part shield portion 29 on the axial direction side. That is, the second shield portion 28 includes the second fixation portion 31 at an edge of the part shield portion 29 on a side opposite to the side continuous with the all shield portion 30. In the present embodiment, the second fixation portion 31 is disposed at, of the three surfaces of the part shield portion 29, a surface between the other two surfaces. As illustrated in FIG. 2, the second metal plate 15 is fixed by the second fixation portion 31 to the lens barrel 16A housing the imaging optical system 16. For example, engagement is employed for fixation of the second fixation portion 31 to the lens barrel 16A of the imaging optical system 16. Fixation is, however, not limited thereto, and welding, bonding with an adhesive, fastening with a screw, and the like may be employed for the fixation.

As illustrated in FIG. 8, the all shield portion 30 of the second shield portion 28 has a gap 32 in the circumferential direction. The gap 32 is a space between ends of a metal flat plate that are caused to face each other when the flat plate is bent into the second metal plate 15. The all shield portion 30 of the second shield portion 28 includes, near the gap 32, the two lock portions 33 adjacent to each other with the gap 32 interposed therebetween. The two lock portions 33 are positioned at an end of the all shield portion 30 on the axial direction side. As illustrated in FIG. 2, the two lock portions 33 are locked with the open portion 25 of the first metal plate 14 in the electronic device 10.

As illustrated in FIG. 8, the second fixation portion 31 and the two lock portions 33 are provided at mutually facing surfaces in the second shield portion 28. Thus, as illustrated in FIG. 2, when the first metal plate 14 and the second metal plate 15 are attached to the electronic device 10, the first fixation portion 26 of the first metal plate 14 and the second fixation portion 31 of the second metal plate 15 hold, from two directions perpendicular to an optical axis, the lens barrel 16A housing the imaging optical system 16.

Figure 9:
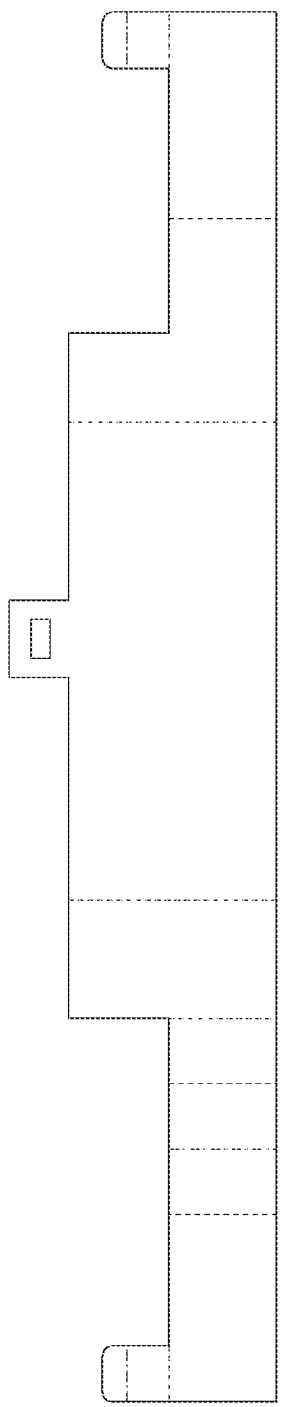
FIG. 9 is a development plan view of the second metal plate in FIG. 8.

The second metal plate 15 is a metal plate, in other words, a metal flat plate having a desired shape such as that illustrated in FIG. 9 and whose predetermined portions are bent. In FIG. 9, straight lines to be bent on the surface side are indicated by broken lines, and straight lines to be bent on the rear surface side are indicated by one-dot chain lines. When the bent portions of the second metal plate 15 are unbent into a flat shape, all of parts of the second metal plate 15 are thus separated from each other without interfering with each other. The second metal plate 15 may be made of, for example, a metal such as copper or the like having large thermal conductivity.

The imaging optical system 16 is constituted by an optical element such as a lens. The imaging optical system 16 is designed and formed to have predetermined values of optical characteristics such as angle of field, depth of field, and the like. The imaging optical system 16 forms an imaged subject image on a light receiving surface of the imaging element 19.

Figure 10:
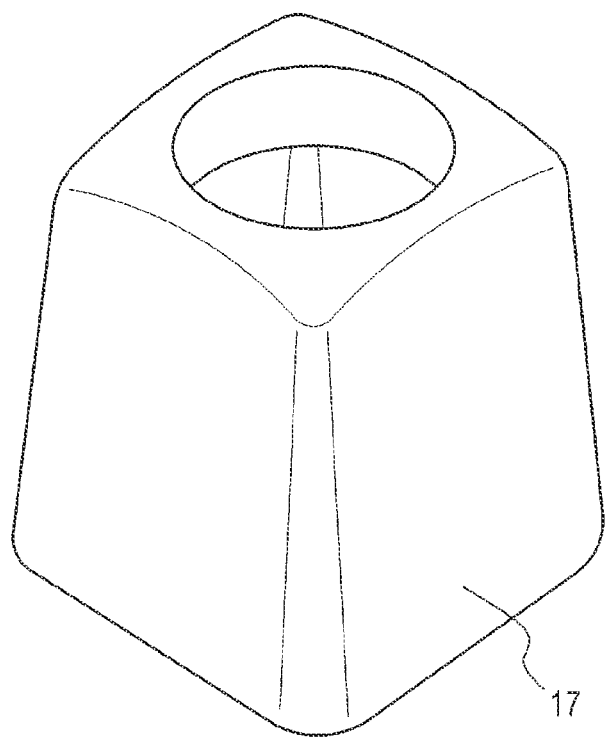
FIG. 10 is a perspective view illustrating an appearance of a first housing in FIG. 2 and FIG. 3.

As illustrated in FIG. 10, the first housing 17 may have a rectangular cylindrical section. As illustrated in FIG. 2 and FIG. 3, the first housing 17 may house the imaging optical system 16 with the optical axis of the imaging optical system 16 substantially coinciding with the axis of the first housing 17 and with the imaging optical system 16 being exposed from one opening. The first housing 17 may house the first substrate 12 such that the imaging element 19 is fixed in an orientation determined at a positioned that is determined relative to the imaging optical system 16. The first housing 17 may house the second substrate 13, the first metal plate 14, and the second metal plate 15 such that the above configuration is satisfied for the first substrate 12.

As illustrated in FIG. 2 and FIG. 3, a third metal plate 34 and an imaging-element cover 35 that surround the side surface of the imaging element 19 in the stacking direction are provided between the imaging optical system 16 and the first substrate 12. The third metal plate 34 may be made of, for example, a metal such as copper or the like having large thermal conductivity. The third metal plate 34 and the imaging-element cover 35 dissipate heat generated by the imaging element 19 to the outside. The imaging-element cover 35 may be made of, for example, a soft material having shape followability, like filler-containing silicone rubber, and having relatively large thermal conductivity.

Figure 11:
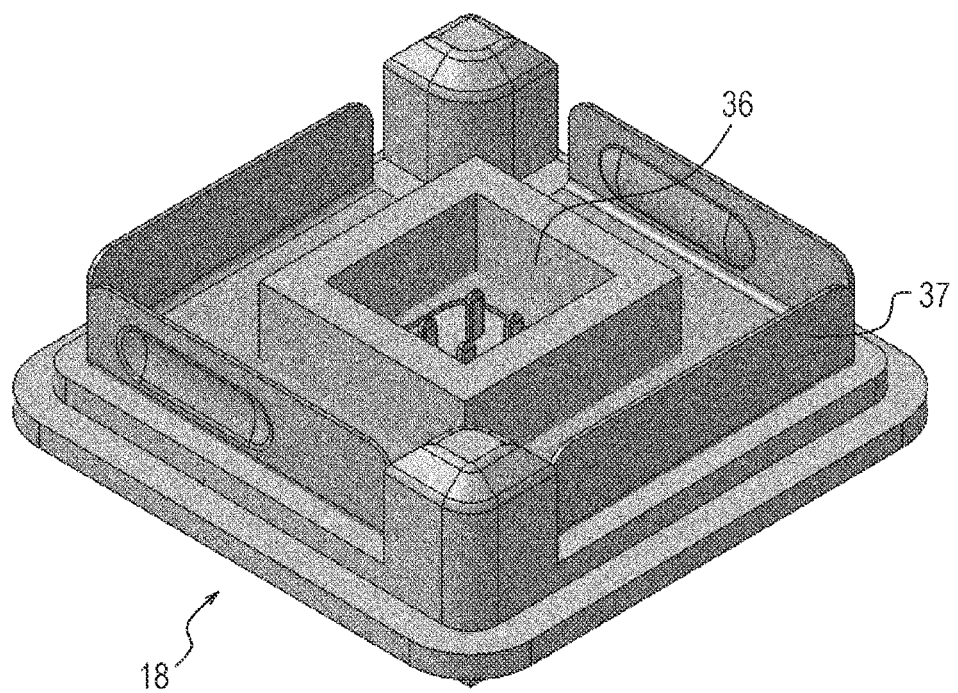
FIG. 11 is a perspective view illustrating an appearance of a second housing in FIG. 2 and FIG. 3.

As illustrated in FIG. 11, the second housing 18 may have a shape including a flat part and a quadrangular prism that extends perpendicular to a main surface of the flat part. The second housing 18 may include a second connector 36 that can be fitted to the first connector 21. The second housing 18 may include a fourth metal plate 37. As illustrated in FIG. 2 and FIG. 3, the fourth metal plate 37 abuts the second metal plate 15 in the electronic device 10. The second housing 18 may be sealed at the flat part to an opening of the first housing 17 on a side opposite to a side that exposes the imaging optical system 16, that is, on the image side of the imaging optical system 16 in the optical axis direction.

Next, a method of manufacturing the electronic device 10 will be described below.

Figure 12:
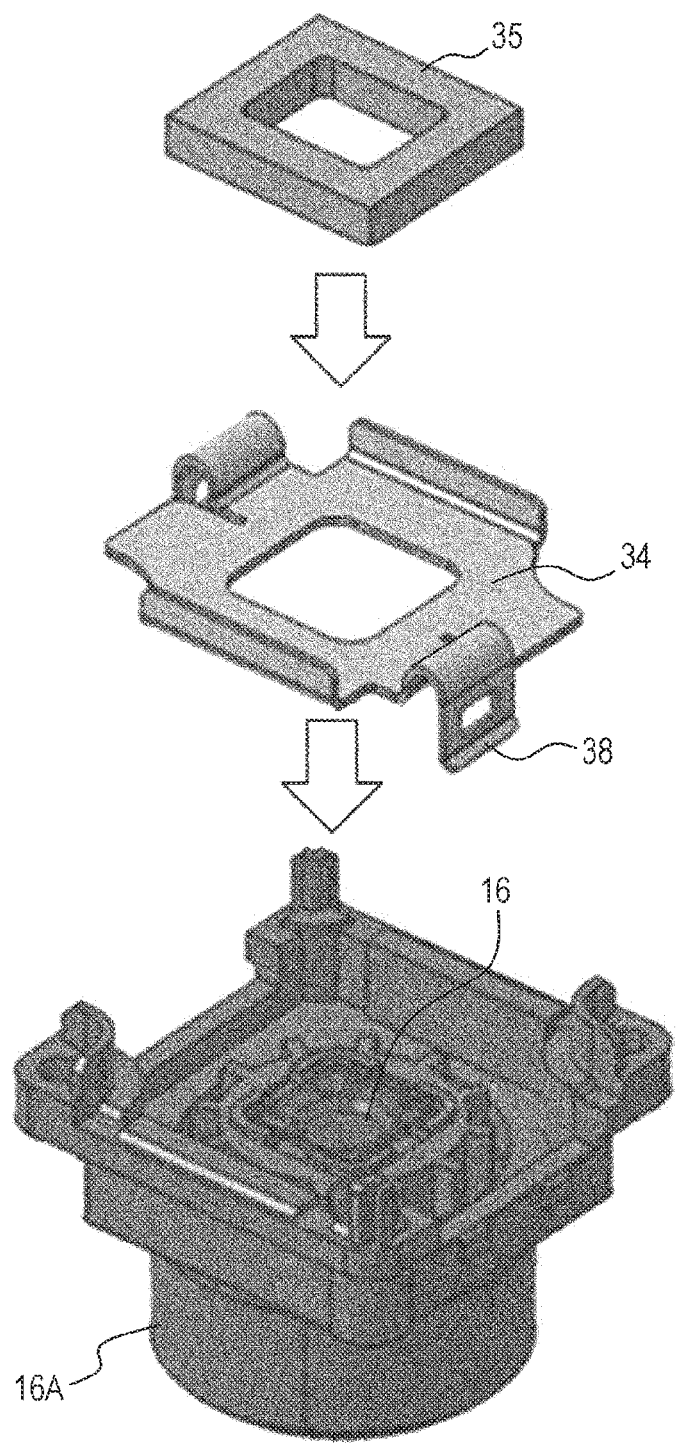
FIG. 12 illustrates a method of manufacturing the electronic device in FIG. 2 and FIG. 3 and illustrates a step of assembling a third metal plate and an imaging-element cover to an imaging optical system.

As illustrated in FIG. 12, the third metal plate 34 and the imaging-element cover 35 are attached to the image side of the lens barrel 16A housing the imaging optical system 16 in the optical axis direction of the imaging optical system 16. The third metal plate 34 is fixed by a third fixation portion 38 included in the third metal plate 34 to the lens barrel 16A of the imaging optical system 16.

Figure 13:
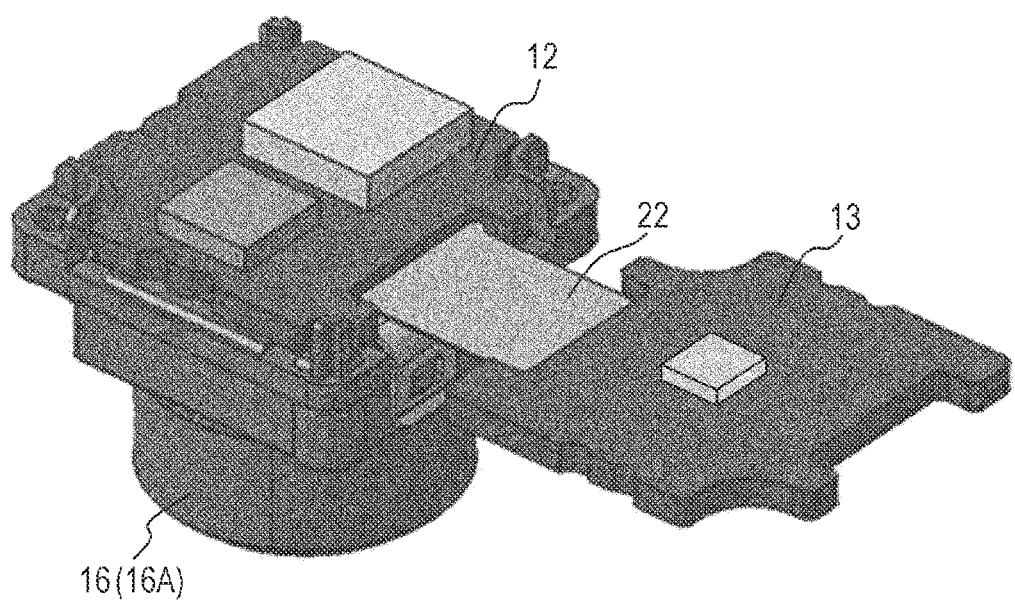
FIG. 13 illustrates a method of manufacturing the electronic device in FIG. 2 and FIG. 3 and illustrates a step of assembling a first substrate to an imaging optical system.

As illustrated in FIG. 13, the first substrate 12 is fixed to the image side of the imaging optical system 16 in the optical axis direction with the imaging optical system 16 and the imaging element 19 facing each other.

Figure 14:
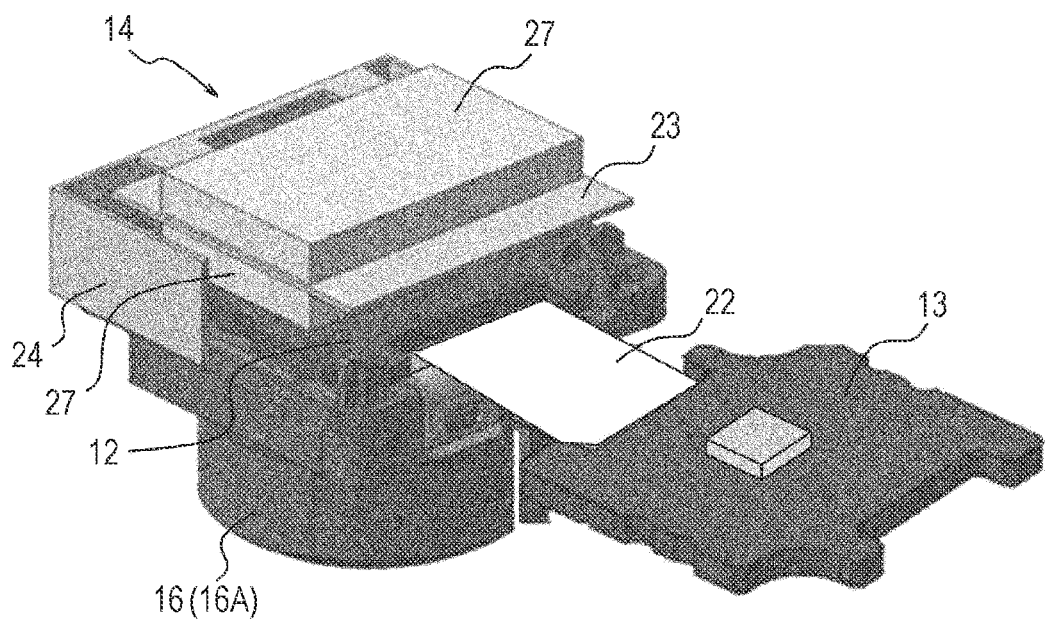
FIG. 14 illustrates a method of manufacturing the electronic device in FIG. 2 and FIG. 3 and illustrates another step of assembling a first substrate and a second substrate to a first metal plate.

As illustrated in FIG. 14, the flat portion 23 of the first metal plate 14 is stuck to the first substrate 12. The heat dissipation sheet 27 may be used to stick the flat portion 23 of the first metal plate 14 and the first substrate 12 to each other. The first shield portion 24 of the first metal plate 14 does not cover, of the first substrate 12, a part where the flexible substrate 22 is provided. The first metal plate 14 is fixed by the first fixation portion 26 to the lens barrel 16A.

Figure 15:
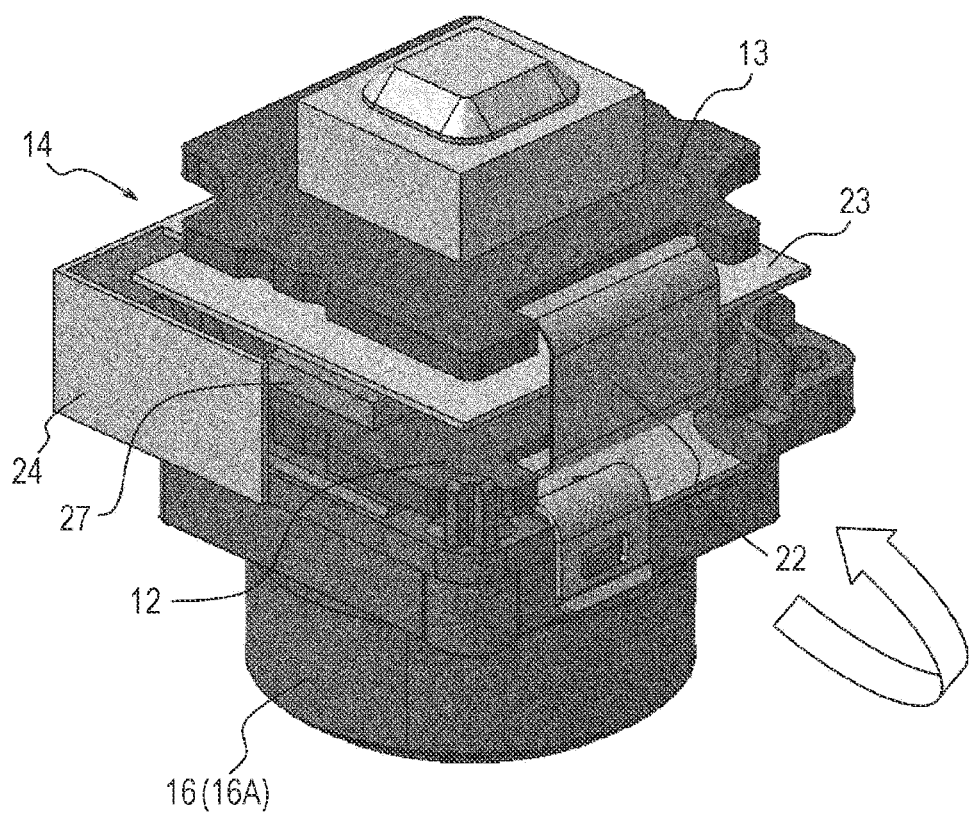
FIG. 15 illustrates a method of manufacturing the electronic device in FIG. 2 and FIG. 3 and illustrates yet another step of assembling a first substrate and a second substrate to a first metal plate.

As illustrated in FIG. 15, the flexible substrate 22 is folded, and the second substrate 13 is stuck to the flat portion 23. The heat dissipation sheet 27 may be used to stick the flat portion 23 of the first metal plate 14 and the second substrate 13 to each other.

Figure 16:
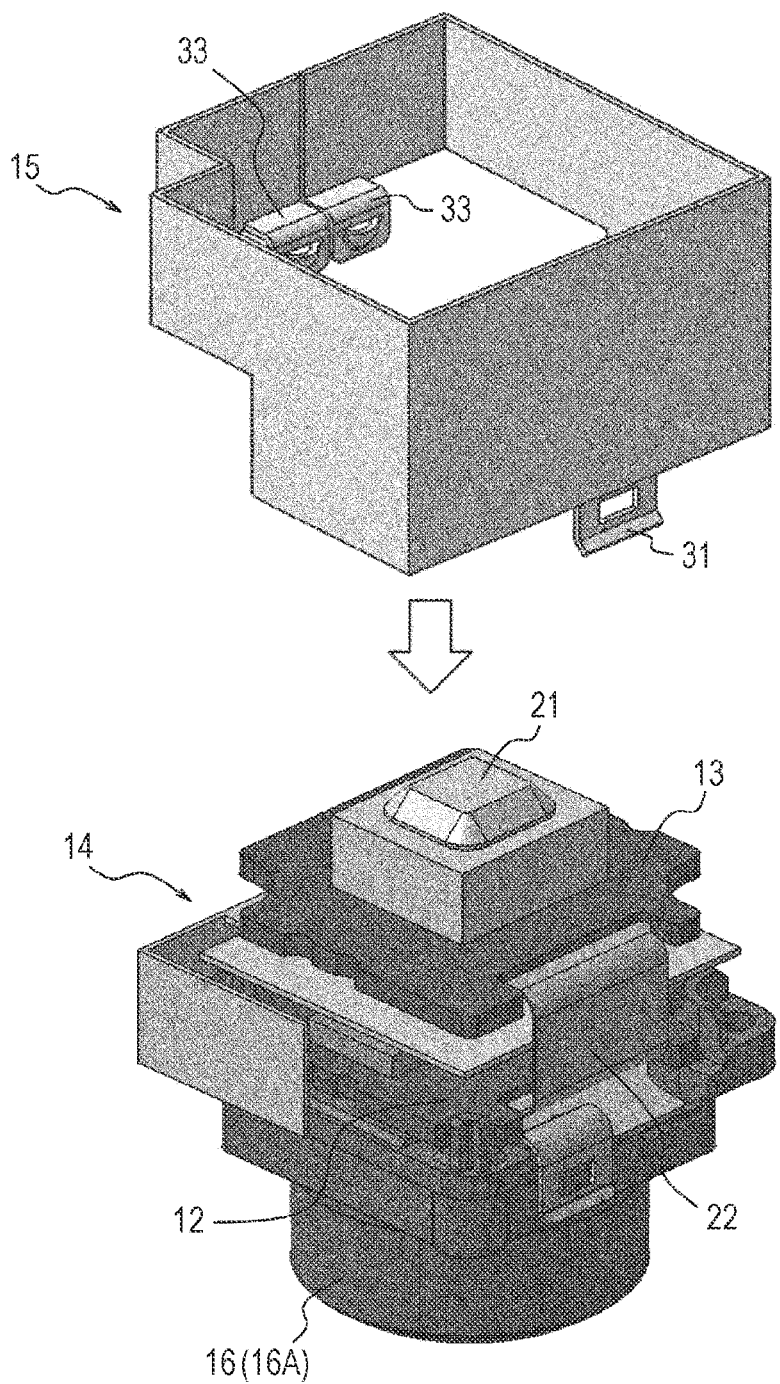
FIG. 16 illustrates a method of manufacturing the electronic device in FIG. 2 and FIG. 3 and illustrates a step of assembling a second metal plate to a first metal plate.
Figure 17:
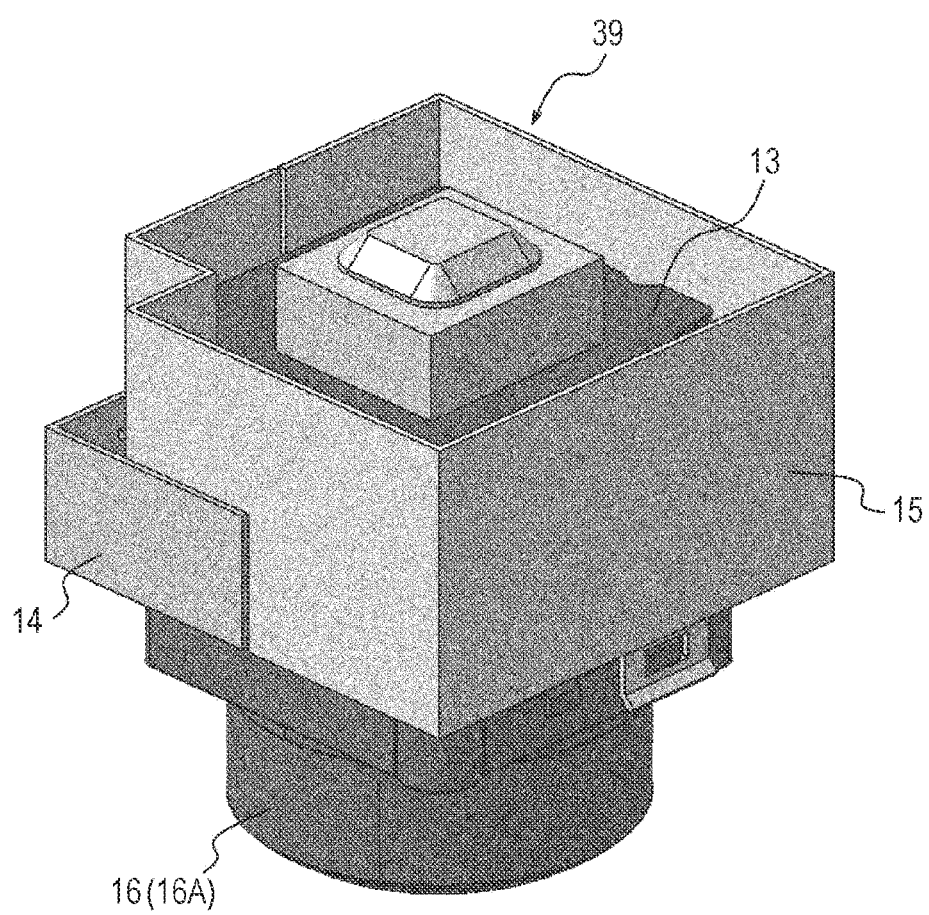
FIG. 17 is a perspective view illustrating an appearance of an internal structure body of the electronic device in FIG. 2 and FIG. 3.

As illustrated in FIG. 16, the second metal plate 15 is attached from the side of the first connector 21 in the optical axis direction of the imaging optical system 16 to cover the circumference of the second substrate 13. The two lock portions 33 of the second metal plate 15 are locked with the open portion 25 of the first metal plate 14. The second metal plate 15 is fixed by the second fixation portion 31 to the lens barrel 16A of the imaging optical system 16. Thus, as illustrated in FIG. 17, an internal structure body 39 of the electronic device 10 is configured.

As illustrated in FIG. 2 and FIG. 3, the second substrate 13 is connected to the second housing 18 by the first connector 21 being fitted to the second connector 36. Consequently, the fourth metal plate 37 abuts the second metal plate 15. Thereafter, the first housing 17 is placed over the second housing 18 to cover the internal structure body 39. That is, the first housing 17 is placed over the second housing 18 to cover the imaging optical system 16, the first substrate 12, the second substrate 13, the first metal plate 14, and the second metal plate 15. The first housing 17 is fixed to the second housing 18 in a state in which the first housing 17 is placed over the internal structure body 39, and the electronic device 10 is thereby manufactured. For example, welding, bonding with an adhesive, fastening with a screw, and the like are employed for fixation of the first housing 17 and the second housing 18.

The electronic device 10 according to the first embodiment with the above configuration includes the flat portion 23 that is interposed between the first substrate 12 and the second substrate 13 and that indirectly abuts the imaging element 19 mounted on the first substrate 12 and the electronic component 20 mounted on the second substrate 13. In the electronic device 10 with such a configuration, the imaging element 19 mounted on the first substrate 12 and the electronic component 20 mounted on the second substrate 13, which are heat sources, are close to the flat portion 23, which generally has thermal conductivity higher than that of the heat dissipation sheet 27. Thus, heat dissipation properties are improved compared with a configuration in which only the heat dissipation sheet 27 is interposed.

In the electronic device 10 according to the first embodiment, the first shield portion 24 and the second shield portion 28 cover the entire circumference of the side surface of the first substrate 12. With such a configuration, the electronic device 10 can have shielding properties with respect to radiation noise of the electronic component 20 mounted on the first substrate 12. In the electronic device 10 according to the first embodiment, the second shield portion 28 covers the entire circumference of the side surface of the second substrate 13. With such a configuration, the electronic device 10 can have shielding properties with respect to radiation noise of the electronic component 20 mounted on the second substrate 13.

In the electronic device 10 according to the first embodiment, the first metal plate 14 includes the flat portion 23 and the first shield portion 24. In the electronic device 10, the second metal plate 15 includes the second shield portion 28. In the electronic device 10 with such a configuration, the flat portion 23 and the first shield portion 24 having the above configurations and the second shield portion 28 having the above configuration can be manufactured in a simple configuration without being subjected to steps of welding and the like.

Therefore, as described above, the electronic device 10 according to the first embodiment can further improve heat dissipation properties with a simple configuration while having shielding properties with respect to radiation noise.

In the electronic device 10 according to the first embodiment, the first metal plate 14 and the second metal plate 15 abut each other directly or indirectly. With such a configuration, the electronic device 10 can improve thermal conduction between the first metal plate 14 and the second metal plate 15 compared with a configuration in which the first metal plate 14 and the second metal plate 15 are separated from each other. Therefore, the electronic device 10 can further improve heat dissipation properties by causing heat generated by a component that directly or indirectly abuts only one of the first metal plate 14 and the second metal plate 15 to be conducted also to the other metal plate. For example, in a configuration in which only one of the first metal plate 14 and the second metal plate 15 abuts a thermal conductor, such as the fourth metal plate 37, for conducting heat inside the electronic device 10 to the outside, the electronic device 10 can cause heat of the other metal plate to be conducted to the thermal conductor in the above configuration.

In the electronic device 10 according to the first embodiment, the first shield portion 24 of the first metal plate 14 covers a portion of the side surface of the first substrate 12, and the second shield portion 28 of the second metal plate 15 covers the entire circumference of the second substrate 13 and a portion of the side surface of the first substrate 12 exposed from the first shield portion 24. With such a configuration, the electronic device 10 can have shielding properties with respect to radiation noise of the electronic component 20 mounted on the first substrate 12 and the electronic component 20 mounted on the second substrate 13 while enabling the first substrate 12 and the second substrate 13 to be easily stuck to the first metal plate 14, even in a configuration in which the first substrate 12 and the second substrate 13 are connected to each other by a wire or the like, such as the flexible substrate 22, extending from the side surface of the first substrate 12.

In the electronic device 10 according to the first embodiment, the second metal plate 15 includes the lock portions 33, and the first metal plate 14 and the second metal plate 15 directly abut each other at the lock portions 33. With such a configuration, the electronic device 10 can increase thermal conduction between the first metal plate 14 and the second metal plate 15 and can connect the first metal plate 14 and the second metal plate 15 to each other stably.

In the electronic device 10 according to the first embodiment, the second metal plate 15 includes, at the second shield portion 28, the two lock portions 33 adjacent to each other with the gap 32 interposed therebetween. With such a configuration, the electronic device 10 can give spring properties to the lock portions 33 and can enable the lock portions 33 of the second metal plate 15 to be easily inserted into and fixed to the open portion 25 of the first metal plate 14. In addition, the electronic device 10 can reduce degradation of the shielding properties by suppressing widening of the gap 32 by the open portion 25 holding the two lock portions 33 adjacent to each other with the gap 32 interposed therebetween.

In the electronic device 10 according to the first embodiment, the flexible substrate 22 that connects the first substrate 12 and the second substrate 13 to each other is covered by the second shield portion 28. With such a configuration, the electronic device 10 can suppress degradation of shielding properties with respect to radiation noise of the electronic component 20 mounted on the first substrate 12 and the electronic component 20 mounted on the second substrate 13 while using the flexible substrate 22 that contributes to easy manufacture and a reduction in manufacturing costs.

Figure 18:
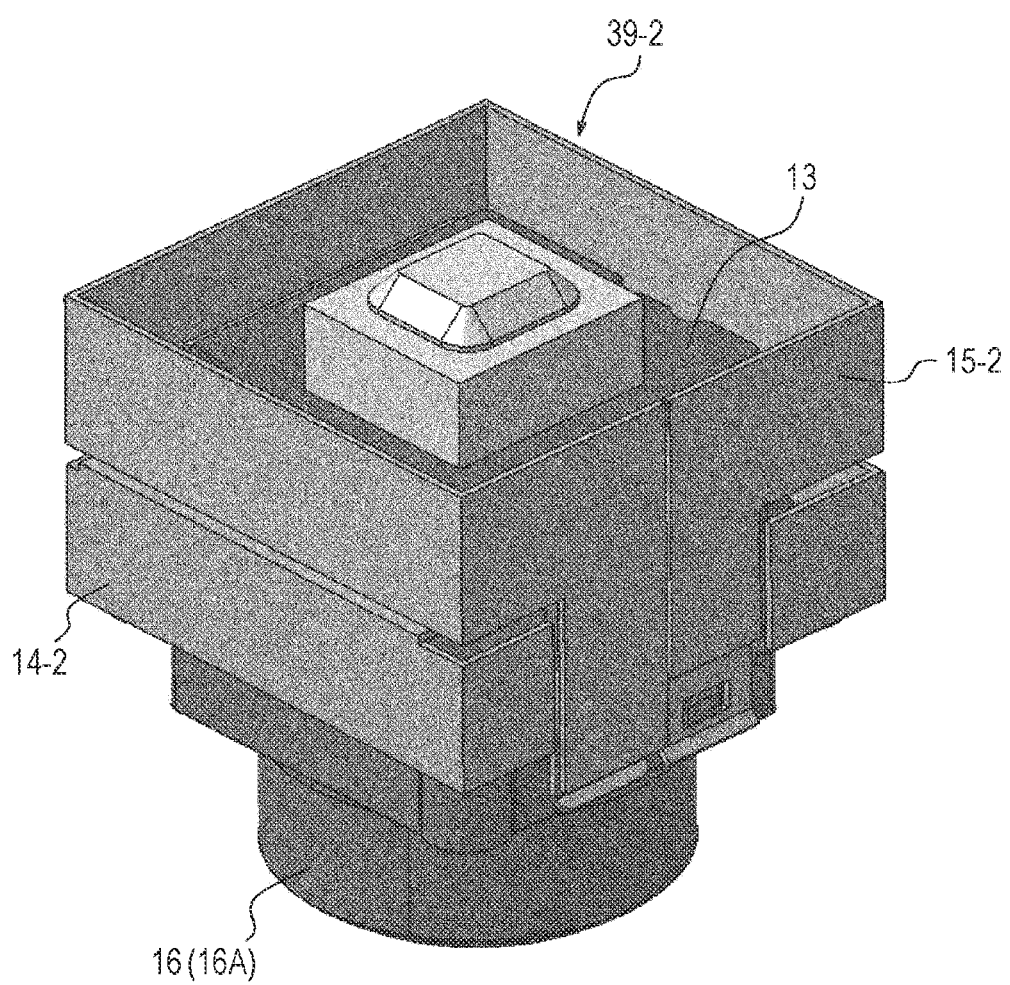
FIG. 18 is a perspective view illustrating an appearance of another internal structure body of an electronic device according to a second embodiment.

Next, with reference to FIG. 18 to FIG. 26, the electronic device 10 according to a second embodiment of the present disclosure will be described. In the second embodiment, the configuration of the internal structure body of the electronic device 10 differs from that in the first embodiment. More specifically, as illustrated in FIG. 18, in an internal structure body 39-2 according to the second embodiment, the shapes of a first metal plate 14-2 and a second metal plate 15-2 differ from the shapes of the first metal plate 14 and the second metal plate 15 of the internal structure body 39 according to the first embodiment, illustrated in FIG. 17. Regarding the second embodiment, features that differ from those in the first embodiment will be mainly described. Parts having the same configurations as those in the first embodiment are given the same signs.

Figure 19:
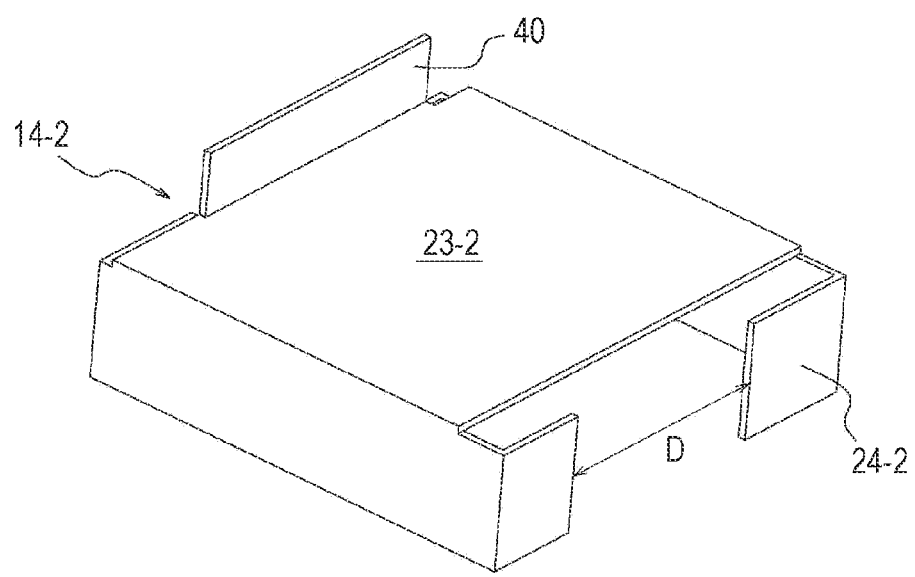
FIG. 19 is a perspective view illustrating an appearance of a first metal plate included in the internal structure body in FIG. 18.
Figure 20:
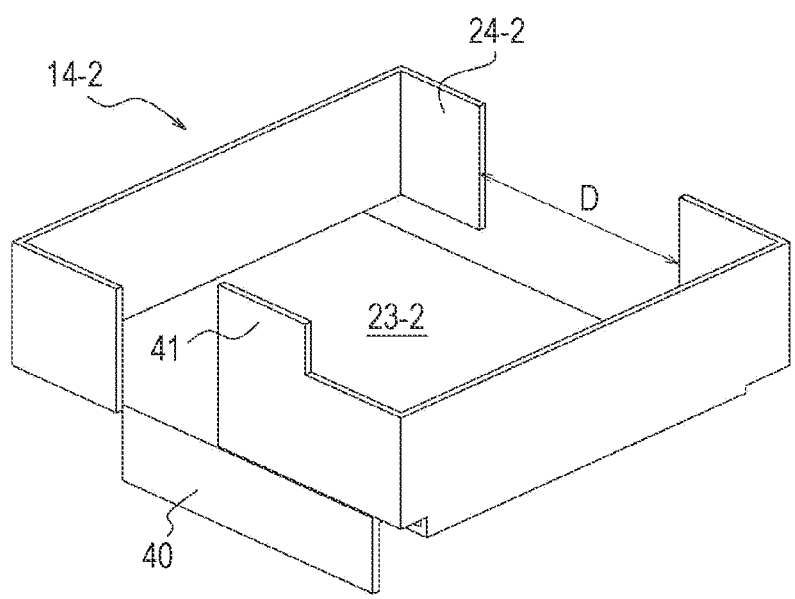
FIG. 20 is a perspective view illustrating an appearance of the first metal plate in FIG. 19 from an angle that differs from the angle in FIG. 19.

With reference to FIG. 19 and FIG. 20, the first metal plate 14-2 will be described. As illustrated in FIG. 19, the first metal plate 14-2 includes a flat portion 23-2 and a first shield portion 24-2.

The flat portion 23-2 differs from the flat portion 23 according to the first embodiment in that the main surface thereof does not include the open portion 25. The structure of the flat portion 23-2 other than the feature of not including the open portion 25 may be the same as the structure of the flat portion 23 according to the first embodiment. The relationship of the flat portion 23-2 with the first substrate 12 and the second substrate 13 may be the same as that in the first embodiment.

The first shield portion 24-2 stands along a portion of the outer edge of the flat portion 23-2. For example, the first shield portion 24-2 is coupled at all of two mutually facing sides of the flat portion 23-2 to the flat portion 23-2. The first shield portion 24-2 stands along the two sides and portions of the other two sides at both ends of the two sides. At one side of two sides not coupled to the first shield portion 24-2, the first shield portion 24-2 stands at both end portions of the one side with a gap of a distance D. The distance D may be longer than the width of the flexible substrate 22.

The flat portion 23-2 includes a standing portion 40 standing along a portion of the outer edge of the flat portion 23-2 in a direction opposite to the direction in which the first shield portion 24-2 stands. The main surface of the standing portion 40 faces a surface of the first shield portion 24-2 having the gap of the distance D. The standing portion 40 is coupled to the first shield portion 24-2 at a side of the outer edge of the flat portion 23-2. The side differs from the sides to which the first shield portion 24-2 is coupled.

FIG. 20 illustrates the first metal plate 14-2 as viewed from an opposite side in a direction perpendicular to the flat portion 23-2 in contrast to FIG. 19. As illustrated in FIG. 20, at a surface of the first shield portion 24-2 opposite to the surface provided with the gap of the distance D, a contact portion 41 extending on a side opposite to the side of the standing portion 40 is present. In the electronic device 10, the contact portion 41 is in contact with the third metal plate 34.

Figure 21:
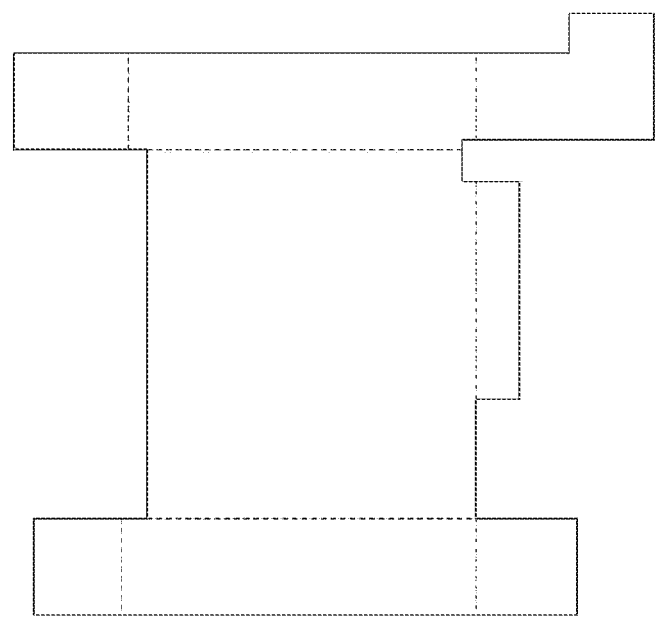
FIG. 21 is a development plan view of the first metal plate in FIG. 19.

The first metal plate 14-2 is a metal plate, in other words, a metal flat plate having a desired shape such as that illustrated in FIG. 21 and whose predetermined portions are bent. In FIG. 21, straight lines to be bent on the surface side are indicated by broken lines, and straight lines to be bent on the rear surface side are indicated by one-dot chain lines. When the bent portions of the first metal plate 14-2 are unbent into a flat shape, all of parts of the first metal plate 14-2 are thus separated from each other without interfering with each other. The first metal plate 14-2 may be made of, for example, a metal such as copper or the like having large thermal conductivity.

Figure 22:
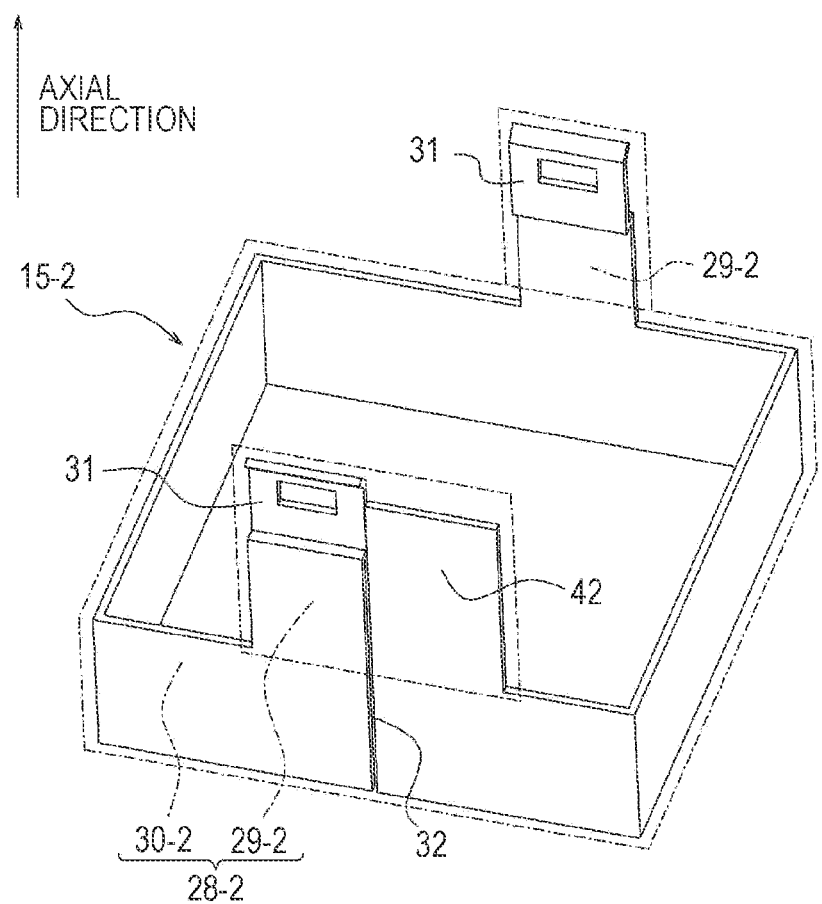
FIG. 22 is a perspective view illustrating an appearance of a second metal plate included in the internal structure body in FIG. 18.

As illustrated in FIG. 22, the second metal plate 15-2 includes a second shield portion 28-2.

The second shield portion 28-2 has a substantially rectangular cylindrical shape and has a section having a rectangular shape in the axial direction. Portions of mutually facing two sides of the rectangular shape project in the axial direction. That is, the second shield portion 28-2 includes an all shield portion 30-2 having a substantially rectangular cylindrical shape, and two part shield portions 29-2 projecting from a portion of each of mutually facing two sides of the rectangular shape of the section in the axial direction and continuous from the all shield portion 30-2 in the axial direction. The main surfaces of the two part shield portions 29-2 face each other. The widths of the main surfaces of the two part shield portions 29-2, that is, the lengths thereof in a direction perpendicular to the axial direction may differ from each other. In the electronic device 10, the second metal plate 15-2 covers the entire circumference of the side surface of the second substrate 13 and a portion of the side surface of the first substrate 12 exposed from the first metal plate 14-2. In this configuration, the all shield portion 30-2 covers the entire circumference of the side surface of the second substrate 13, and the part shield portions 29-2 covers a portion of the side surface of the first substrate 12 exposed from the first metal plate 14.

The two part shield portions 29-2 of the second shield portion 28-2 each include the second fixation portion 31 at an end on a side not continuous with the all shield portion 30-2. Consequently, when the second metal plate 15-2 is attached to the electronic device 10, the two second fixation portions 31 hold the lens barrel 16A housing the imaging optical system 16 from two directions perpendicular to the optical axis.

The second shield portion 28-2 includes the gap 32 extending over one of the part shield portions 29-2 and the all shield portion 30-2 in the circumferential direction. The gap 32 is substantially parallel to the axial direction. The gap 32 is a space between ends of a metal flat plate that are caused to face each other when the flat plate is bent into the second metal plate 15-2. The second fixation portion 31 at one of the part shield portions 29-2 is positioned near the gap 32. A contact portion 42 adjacent, at the one of the part shield portions 29-2, to the second fixation portion 31 with the gap 32 therebetween is in contact with the third metal plate 34 in the electronic device 10.

Figure 23:
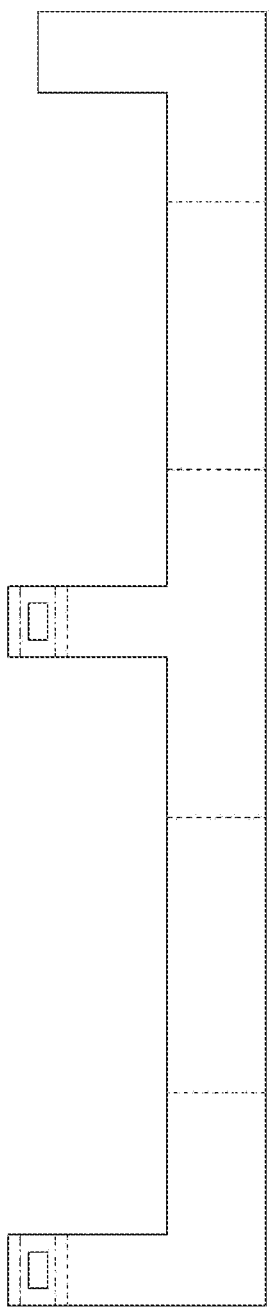
FIG. 23 is a development plan view of the second metal plate in FIG. 22.

The second metal plate 15-2 is a metal plate, in other words, a metal flat plate having a desired shape such as that illustrated in FIG. 23 and whose predetermined portions are bent. In FIG. 23, straight lines to be bent on the surface side are indicated by broken lines, and straight lines to be bent on the rear surface side are indicated by one-dot chain lines. When the bent portions of the second metal plate 15-2 are unbent into a flat shape, all of parts of the second metal plate 15-2 are thus separated from each other without interfering with each other. The second metal plate 15-2 may be made of, for example, a metal such as copper or the like having large thermal conductivity.

Next, a method of manufacturing the internal structure body 39-2 will be described below.

As described with FIG. 12 and FIG. 13, the first substrate 12 is attached to the lens barrel 16A housing the imaging optical system 16 via the third metal plate 34 and the imaging-element cover 35.

Figure 24:
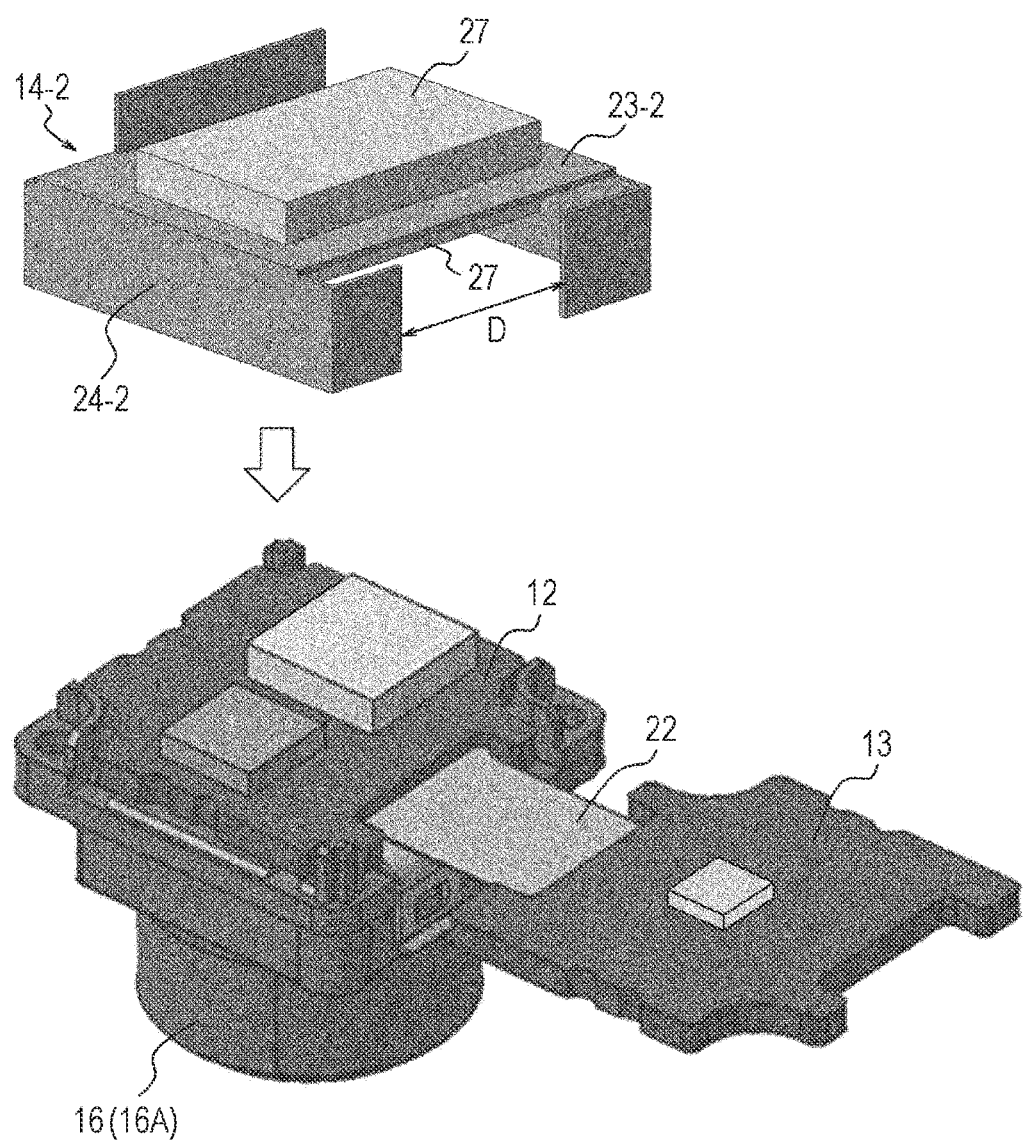
FIG. 24 illustrates a method of manufacturing the internal structure body in FIG. 18 and illustrates a step of assembling a first metal plate to a first substrate.
Figure 25:
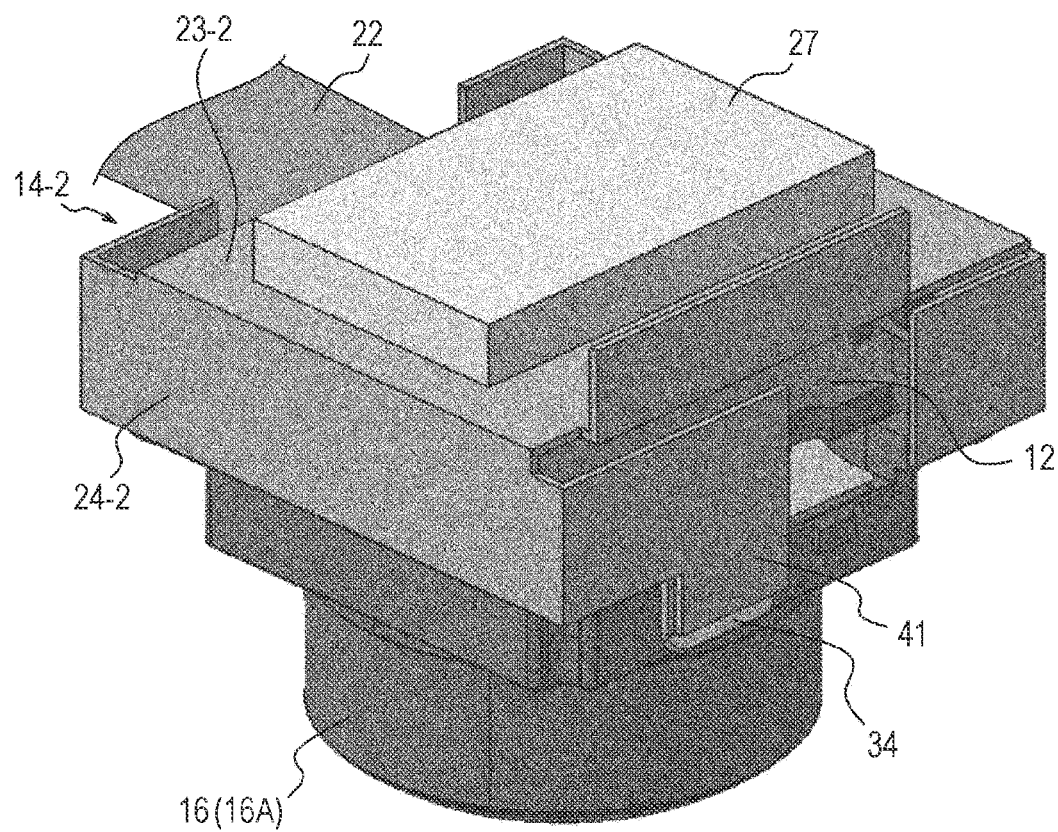
FIG. 25 illustrates a state in which the first metal plate in FIG. 24 is assembled to a first substrate.

As illustrated in FIG. 24, the flat portion 23-2 of the first metal plate 14-2 is stuck to the first substrate 12. The heat dissipation sheet 27 may be used to stick the flat portion 23-2 of the first metal plate 14-2 and the first substrate 12 to each other. The first metal plate 14-2 is stuck to the first substrate 12 to enable the flexible substrate 22 of the first substrate 12 to pass through the gap of the distance D included in the first shield portion 24-2. Consequently, as illustrated in FIG. 25, the contact portion 41 of the first metal plate 14-2 is in contact with the third metal plate 34. FIG. 25 illustrates a state in which the first metal plate 14-2 is stuck to the first substrate 12, the state being rotated around the axial direction of the lens barrel 16A by 180 degrees from that in FIG. 19. In FIG. 25, illustration of a portion of the flexible substrate 22 and the second substrate 13 is omitted.

Figure 26:
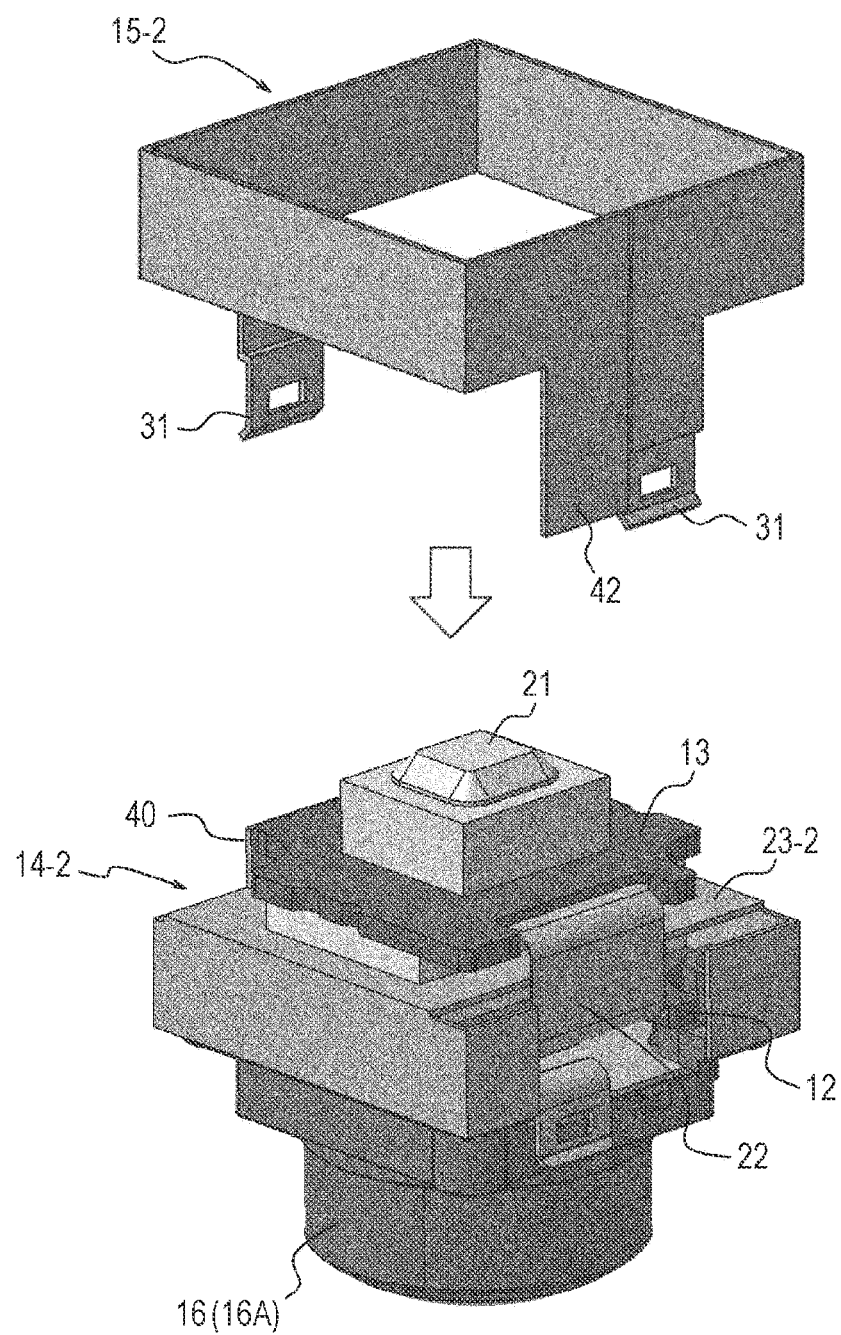
FIG. 26 illustrates a method of manufacturing the internal structure body in FIG. 18 and illustrates a step of assembling a second substrate to an imaging optical system.

As illustrated in FIG. 26, the flexible substrate 22 is folded, and the second substrate 13 is stuck to the flat portion 23-2. The heat dissipation sheet 27 may be used to stick the flat portion 23-2 of the first metal plate 14-2 and the second substrate 13 to each other.

The second metal plate 15-2 is attached from the side of the first connector 21 in the optical axis direction of the imaging optical system 16 to cover the circumference of the second substrate 13. The second metal plate 15-2 is fixed by the two second fixation portions 31 to the lens barrel 16A housing the imaging optical system 16. Consequently, the contact portion 42 of the second metal plate 15-2 is in contact with the third metal plate 34. Thus, the first metal plate 14-2 and the second metal plate 15-2 abut each other indirectly via the third metal plate 34. As described above, the internal structure body 39-2 of the electronic device 10 is configured as illustrated in FIG. 18.

In the electronic device 10 according to the second embodiment with such a configuration, the flat portion 23-2 of the first metal plate 14-2 is not provided with an open portion for locking, as with the first embodiment, the first metal plate 14-2 and the second metal plate 15-2 with each other. With such a configuration, the electronic device 10 can increase the area of the flat portion 23 that can directly or indirectly abut the imaging element 19 mounted on the first substrate 12 and the electronic component 20 mounted on the second substrate 13, which are heat sources, and can improve heat dissipation properties.

In the electronic device 10 according to the present embodiment, the first metal plate 14-2 and the second metal plate 15-2 abut each other indirectly via the third metal plate 34. With such a configuration, the electronic device 10 can reduce heat conduction between the first metal plate 14-2 and the second metal plate 15-2 compared with a configuration in which the first metal plate 14-2 and the second metal plate 15-2 abut each other. Thus, even in a configuration in which one of the first metal plate 14-2 and the second metal plate 15-2 is close to a component that is to be greatly affected by a high temperature, the electronic device 10 can reduce heat conduction from the other one to the one even when the temperature of the other one is increased.

Although the present disclosure has been described on the basis of the drawings and the embodiments, it should be noted that it is easy for a person skilled in the art to perform various changes and corrections on the basis of the present disclosure. Accordingly, it should be noted that these changes and corrections are included in the scope of the present disclosure.

The invention claimed is:

1. An electronic device comprising:
 a first substrate and a second substrate with respective main surfaces, and on each of which an electronic component is mounted, the first substrate and the second substrate positioned in a stacking direction with the respective main surfaces facing each other;
 a first metal plate including
  a flat portion that is interposed between the first substrate and the second substrate, and that directly or indirectly abuts the electronic component mounted on the first substrate and the electronic component mounted on the second substrate, and a first shield portion that covers a portion of a side surface of the first substrate; and
 a second metal plate including a second shield portion that surrounds a circumference of the second substrate and covers another portion of the side surface of the first substrate that is not covered by the first shield portion, wherein the second shield portion does not cover the portion of the side surface of the first substrate that is covered by the first shield portion, wherein the first metal plate and the second metal plate abut each other directly or indirectly.

2. The electronic device according to claim 1, wherein the second metal plate includes at least one lock portion, and the first metal plate and the second metal plate abut each other directly at the lock portion.

3. The electronic device according to claim 2, wherein the second metal plate includes a gap in a circumferential direction of the second substrate, and the lock portion comprises two lock portions adjacent to each other with the gap interposed therebetween.

4. The electronic device according to claim 1, wherein the first substrate and the second substrate are connected to each other by a flexible substrate, and the flexible substrate is covered by the second shield portion when viewed in a direction perpendicular to the stacking direction.

5. The electronic device according to claim 1, wherein the first substrate includes an imaging element on a side of the first substrate that is opposite to a surface of the first substrate that faces the flat portion.

6. An imaging apparatus comprising:

a first substrate and a second substrate with respective main surfaces, and on each of which an electronic component is mounted, the first substrate and the second substrate positioned in a stacking direction with the respective main surfaces facing each other;

a first metal plate including
a flat portion that is interposed between the first substrate and the second substrate, and that directly or indirectly abuts the electronic component mounted on the first substrate and the electronic component mounted on the second substrate, and a first shield portion that covers a portion of a side surface of the first substrate; and a second metal plate including
a second shield portion that surrounds a circumference of the second substrate and covers another portion of the side surface of the first substrate that is not covered by the first shield portion, wherein the second shield portion does not cover the portion of the side surface of the first substrate that is covered by the first shield portion, wherein the first metal plate and the second metal plate abut each other directly or indirectly.

7. A mobile body comprising the imaging apparatus according to claim 6 mounted thereon.

* * * * *